May 18, 1965        R. S. JONES        3,183,988

COMPOSITE VEHICLE FOR TRAVELING OVER LAND AND/OR WATER

Filed Jan. 8, 1962        4 Sheets-Sheet 1

INVENTOR
RICHARD STANTON JONES

BY *Larson and Taylor*

ATTORNEYS

May 18, 1965   R. S. JONES   3,183,988
COMPOSITE VEHICLE FOR TRAVELING OVER LAND AND/OR WATER
Filed Jan. 8, 1962   4 Sheets-Sheet 2
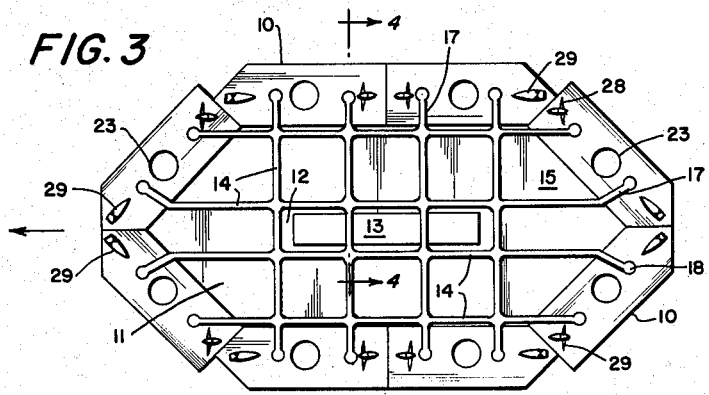
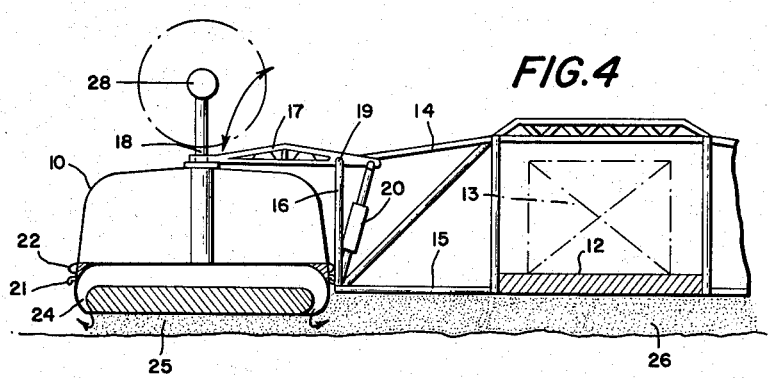
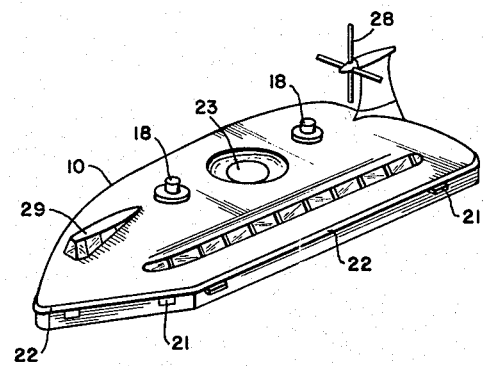
INVENTOR
RICHARD STANTON JONES
BY *Larson and Taylor*
ATTORNEYS May 18, 1965  R. S. JONES  3,183,988
COMPOSITE VEHICLE FOR TRAVELING OVER LAND AND/OR WATER
Filed Jan. 8, 1962  4 Sheets-Sheet 3

INVENTOR
RICHARD STANTON JONES

BY *Larson and Taylor*

ATTORNEYS

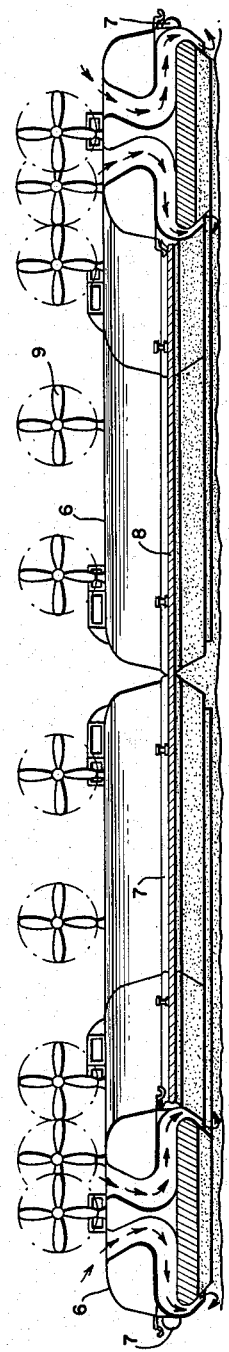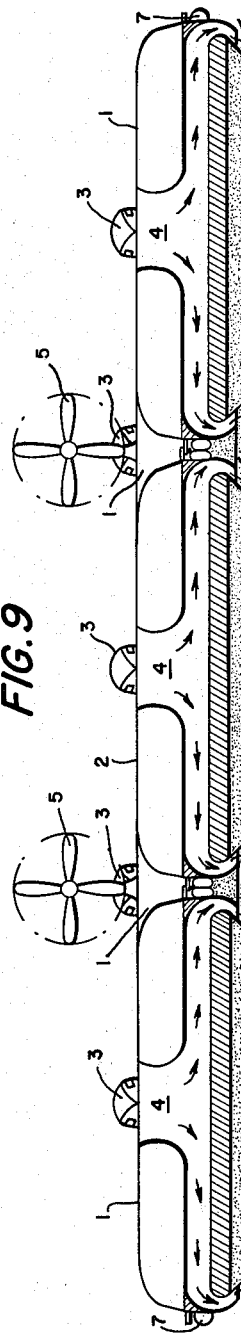
FIG.8
FIG.9
INVENTOR
RICHARD STANTON JONES

United States Patent Office 3,183,988
Patented May 18, 1965

3,183,988
COMPOSITE VEHICLE FOR TRAVELING OVER LAND AND/OR WATER
Richard Stanton Jones, Cowes, Isle of Wight, England, assignor to Westland Aircraft Limited, Yeovil, Somerset, England
Filed Jan. 8, 1962, Ser. No. 164,956
Claims priority, application Great Britain, Jan. 17, 1961, 1,971/61
7 Claims. (Cl. 180—7)

This invention relates to vehicles for the conveyance of passengers or freight, and is particularly concerned with the improvement of payload capacity of ground-effect vehicles. However, the invention may also include vehicles of the pure jet reaction type or direct ducted fan type which can be operated as a ground effect vehicle as later described.

It is therefore one of the objects of this invention to provide an improved ground-effect vehicle, the construction of which gives a far greater payload capacity against a given power availability than constructions so far proposed.

A further object is to provide an arrangement of ground-effect vehicle train sets, the use of which from the opening viewpoint provides maximum utilisation of the power units.

Yet another object is to provide a method of increasing the total payload which can be conveyed by a predeterminded number of ground-effect vehicles.

Another object is to provide a construction suited to a very large ground effect vehicle, the construction obviating the problems of integral duct construction and power plant installation, at the same time permitting the ready exchange of power units and/or peripheral duct sections without the necessity of dismantling the main structure or removing the vehicle from use for any length of time.

Yet a further object is to provide a composite vehicle having an assembly of individual units which themselves constitute small self-propelled individual vehicles for ferry or similar duties.

According to one feature of the present invention I provide a composite vehicle for conveyance of passenger or freight, consisting of a separable assembly of individually operable units which together form, or releasably carry, a payload-supporting platform or cabin, each of the units incorporating an air or gas discharge system, the complete vehicle including one or more air intakes and power plants for generating a flow of gas or air which is passed to the discharge systems of the units, the arrangement being such that the air or gas is downwardly discharged under pressure and builds up a ground-effect pressurised air or gas cushion beneath the platform or cabin to support the weight of the said composite vehicle including the payload. When using this construction, the individual units may produce beneath themselves either a pure jet reaction discharge, a direct ducted-fan air flow, or a (ground-effect pressurised air cushion) but, as assembled, the units are arranged so that the effect of their combined air or gas discharge builds up a ground-effect cushion beneath the whole assembly. When such units carry a payload-supporting platform or cabin to which they are releasably attached, they can be quickly released for servicing and rapidly replaced by a spare unit. The arrangement is most advantageous in the construction of large ground-effect vehicles, since the main passenger or freight-carrying platform can be fabricated as an integral inert structure to which a number of units each constituting part of the jet or duct air or gas discharge system are releasably attached.

According to another feature of the invention, the individual units may be indpendent self-propelled vehicles when detached from the assembly, and the composite assembly formed when they are coupled together provides a surface area, under which the ground-effect pressurised air cushion is generated, of such size that the payload which can be conveyed by the composite vehicle is much greater, calculated to be many times larger, than that which can be conveyed by the total number of self-propelled vehicles when detached from the assembly and operated individually. Since such a composite vehicle may comprise a number of individually-operable vehicles, we conveniently provide control means at least at one point of the assembly for a crew to effect overall control of all releasable units or vehicles forming the composite vehicle. In preferred constructions, the detachable individual units or vehicles are ground-effect vehicles themselves, conveniently of the annular peripheral jet type, and I prefer to provide at least some of the forward propulsion and directional control, if not all, by means of air-screws mounted on the individual units of the assembly and driven by the power plants thereof.

The invention lends itself to the construction of large ground-effect vehicles requiring a number of power plants and in this connection we prefer to form the vehicle of a central payload-carrying platform or cabin structure having the individual power units or small vehicles releasably attached around the periphery to provide both motivation and the duct system, which then need not be built into the main structure. In this way a standardized power plant unit can be made which may be utilized with composite vehicles of different sizes, and they are readily interchangeable.

Composite ground-effect vehicle constructed in accordance with the invention enable the building and operation of most versatile transport systems in an economical manner. By utilizing constructions where a separate inert platform or main cabin is adopted, these main platforms or cabins can be made of suitably varying sizes and configurations, and utilized assembled to a suitable number of the smaller individual vehicles disposed around the periphery, in accordance with the prevailing traffic loading. In addition, the small units can be utilized separately and individually to feed branches from a main trunk route junction where the main platform or cabin remains until the return journey. Delay in turn-round can be eliminated, in that three platforms or cabins (apart from those which may be integral in the construction of the individual smaller vehicles) can be operated using only one set of the smaller vehicles for motivation of all three. One platform or cabin is then used en-route between two route terminations, being carried by the smaller vehicles assembled to it, whilst the other two are in the inert state and respectively located at each termination loading or unloading. In this way, maximum utilization of the available power units of a limited fleet can be made. Rapid interchange of power units for servicing is facilitated since it is only necessary to pilot a replacement vehicle into position in the assembly. To economise in man-power, each main platform or cabin is provided with a master-controller system which converts the control systems of the smaller individual vehicles into slave systems when coupled to the main platform or cabin. The master-controller system may be operable from two alternative positions to provide interchangeable fore-and-aft control positions enabling the composite vehicle to avoid turning around before or just after each departure, depending upon the construction.

It will thus be understood that the invention also includes a ground-effect vehicle train, for the conveyance of passengers or freight. In accordance with this feature of the invention, such a train consists of a disconnectable assembly of individual ground-effect vehicles of substantially identical shape arranged and coupled in such a way that when assembled they carry between them a payload-supporting cabin or platform beneath which the combined pressure air or gas discharge from the coupled individual vehicles generates a ground-effect pressurised air cushion such that the payload which can be carried by the assembly and said platform or cabin is greater than that which can be conveyed by the total number of individual vehicles employed when the vehicles are detached from the assembly and simultaneously operated as individual vehicles.

It will of course be understood by those skilled in the art that, in all constructions, a fluid-tight seal is made between the power units or smaller vehicles and the periphery of the platform, or between the mating sides of the smaller vehicles or power units where an assembly of these constitautes the platform, cabin, or composite ground-effect vehicle, to enable the ground-effect pressurised air cushion to be built up under the assembly.

Several constructions of composite ground-effect vehicle or train in accordance with the invention will now be described, by way of example only, with reference to the accompanying drawings in which:

FIGURE 3 is a modification of the type of composite vehicle shown in FIGURE 1.

FIGURE 4 is a section along the line IV—IV of FIGURE 3.

FIGURE 5 is a perspective view of a self-propelled ground-effect vehicle suitable for use in the assembly shown in FIGURES 3 and 4.

Figure 1:
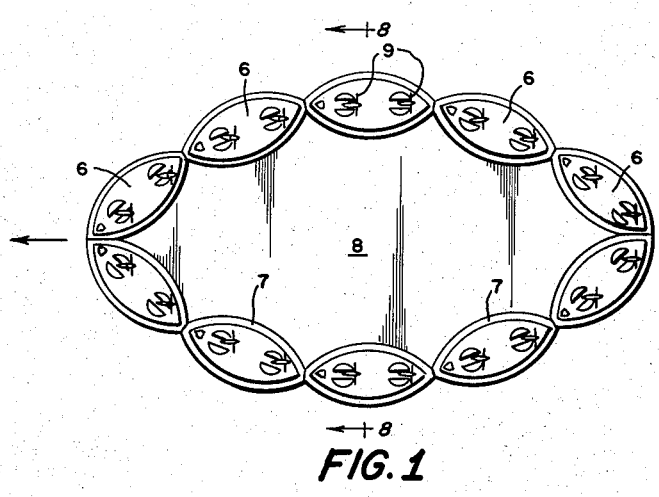
FIGURE 1 is a plan view of a composite vehicle having an inert central payload-supporting cabin or platform to the periphery of which individual smaller vehicles are coupled.
Figure 2:
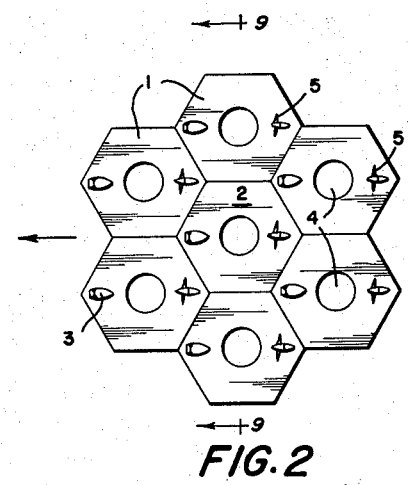
FIGURE 2 is a plan view of a composite ground-effect vehicle or train formed by an assembly of coupled hexagonal units.

FIGURES 8 and 9 are cross-sectional views taken along the lines 8—8 and 9—9 in FIGURES 1 and 2 respectively.

Referring to the drawings, FIGURE 1 illustrates in plan view a series of identically shaped and sized ground-effect vehicles 6, which may conveniently be constructed according to British Patent 860,781 (United States application Serial No. 155,919) and include features and techniques forming the subject of British patent applications 32207/60 (United States application Serial No. 181,758), and 37421/60 (United States application Serial No. 184,-482) and which are configurated to fit into and make a fluid-tight seal in concave recesses fabricated in the periphery of a very large passenger cabin or payload-supporting platform 8 to which the vehicles 6 are coupled. The units 6 are coupled to platform 8 by any suitable means, such as by hook and ring, as shown in FIG. 8. The fluid seal is maintained by the inflatable buffers which are shown most clearly at 7 in FIG. 8. The whole assembly forms a very large composite ground-effect vehicle. The vehicles 6 are detachable from the platform or cabin 8, for individual use, whilst the cabin or platform 8 is an inert structure incapable of ground-effect motivation unless the vehicles 6 are attached thereto. The vehicles 6 each have two airscrews 9 for providing propulsion, and directional control is obtained by swivelling the airscrews about a vertical axis in any convenient manner, the particular swiveling structure forming no part of the instant invention. The cabin in platform 8 is provided with a Master Controller system, which can be similar to that later described with reference to FIGURES 6 and 7. A Master Control point can be provided at each end of the long axis of the platform or cabin 8, so that either end can constitute the bow during operation.

In the construction shown, the vehicles 6 are self-contained units each incorporating an air intake and power plant for generating a flow of air and a discharge system through which the generated air flow is discharged downwardly. When all the vehicles are operated simultaneously, coupled to the platform or cabin 8, they constitute a peripheral jet system for the cabin or platform. The air discharged under pressure by the combination generates a ground-effect pressurised air cushion beneath the base of the cabin or platform 8. The surface area presented by the base is of such size that the resultant pressurised ground-effect air cushion generated under the composite vehicle or train will lift a payload which is much greater than the total payload which can be lifted by all the vehicles 6 operated individually, when detached from the assembly. This greatly improved performance in the composite vehicle or train is achieved without a corresponding increase in the overall power requirements.

In FIGURE 2, six small ground-effect vehicles 1 of hexagonal plan-form are shown releasably assembled in edge contact around a similar vehicle 2 or inert platform of hexagonal shape. Each vehicle 1 has a control cabin 3, and an air intake 4 which communicates with a peripheral air discharge duct or jet system located around its base. A fan is located in the intake 4 and is coupled to an engine mounted within the vehicle. The engine rotates the fan which in turn draws in air through the intake 4, compresses the air, and discharges it under pressure downwardly through the peripheral duct or jet system, to form a pressurised ground-effect air cushion beneath the vehicle. Propulsion and directional control is provided by a propeller 5 coupled to the vehicle engine, and the airscrew nacelle can be swivelled about a vertical axis to provide the directional control.

The mating faces of the vehicles 1 and platform or vehicle 2 make a fluid-tight seal. As a result of this, when all the vehicles are simultaneously operated as shown, their combined effort generates a ground-effect air cushion under the whole assembly, which constitutes a composite ground-effect vehicle or train. The vehicle or platform 2 can be provided with a master controller giving overall control over the operation of all the vehicle with assembly from one point, as described later with reference to FIGURES 6 and 7. The complete assembly of the vehicles 1 forms a payload-supporting platform, and the total load which can be lifted and transported by the composite vehicle or train they form is greater than that which can be lifted by the vehicles 1 when released from the assembly and operated individually.

The invention can be applied for special purposes for the transport of heavy equipment over rough terrain. For example, in prospecting for oil it is customary to dismantle the test drill rigs substantially completely in order to be able to transport them in small loads to a new site. Huts and other equipment must also be dismantled and transported. The dismantling, transportation and re-erection is a lengthy and in many cases difficult operation which is anyway very expensive. FIGURES 3 and 4 illustrate a composite ground-effect vehicle or train which comprises an assembly of identically shaped and sized peripheral jet type ground-effect vehicles 10, assembled to the periphery of a payload-supporting platform 11 suitable for transporting such drill rigs. FIGURE 5 shows one of the vehicvles 10 is more detail. These drawings, in addition to showing constructional details of the platform 11, disclose arrangements by which small self-contained power units or ground-effect machines may be releasably coupled to a payload-supporting cabin or platform. The platform 11 is made of comparatively thin sheet metal panelling 15 having an upturned periphery 16 of the same material. Joints between adjacent panel sections are fluid-tight. The panelling 15 and 16 is attached to and braced by a spider structure composed of interconnected girder sections 14. Centrally, the girder sections 14 support a reinforced load-area 12 on which the payload 13 is lashed. The upper girder structure may have removable or hinged parts above the load area 12 to facilitate loading. The end of each girder section 14 terminates with a female coupling arm 17 which, as shown in FIGURE 4, releasably engages a male coupling 18 carried by the vehicle 10. The coupling arms 17 are pivotally connected at 19 to the associated girder section 14 and a hydraulic jack 20 which is operative to raise the arm 17 out of engagement with the associated vehicle 10, when it is desired to release a vehicle 10 for independent operation. Adjacent pairs of arms 17 are utilized to couple each vehicle 10 to the platform 11.

When coupled, each vehicle 10 makes fluid-tight contact with the peripheral panelling 16 and its adjacent vehicles by means of attachment fittings 21 and a peripheral inflated bumper 22. All the vehicles 10 are operated simultaneously, intaking air at 23, compressing the air, and discharging the air under pressure through peripheral ducts 24 (FIG. 4). As a result, a pressurised ground-effect air cushion is generated beneath each vehicle at 25. In addition, the combined vehicles constitute a peripheral duct and jet discharge system for the platform 11 and, since they make fluid-tight contact both with it and their adjacent vehicles, a pressurised ground-effect air cushion is also generated at 26 beneath the platform to lift the whole assembly off the ground and support the weight. Forward propulsion is obtained via the airscrew 28 of each vehicle, and these are swivelled synchronously on their mountings to provide directional control. In the construction shown, each vehicle 10 is independently controlled, overall control and synchronisation being effected by an intercommunication system between the vehicles 10, the cabin 29 of the leading vehicles being used as master control positions. Since the construction described is for special purposes and for use over rough terrain where obstacles may have to be circumnavigated and the direction of movement changed frequently, overall control by vehicle intercommunication is advantageous in that control can be transferred to the vehicle providing the best observation point at any given moment. It will be understood, that where oil drilling is to be effected on the sea bed, the drill rig platform may be specially constructed to form the payload platform of a composite vehicle according to the invention, having extensible legs by which it can stand on the sea bed.

In constructions of composite vehicle in which a Master/Slave control system is to be incorporated, any suitable combination of known devices may be utilized. However, we prefer to utilize a Master Controller which operates relays and electro-hydraulic actuators located in the individual power units or small self-propelled vehicles comprised in the assembly. In this way, servicing of the Master Controller may be grouped with that of the main cabin or platform structure in appropriate constructions, whilst the actuators are located in the slave units or vehicles and serviced with them. Further, when the slave units are themselves vehicles, their existing control systems can be such that the action of making an electrical connection with the Master Controller when they are coupled together or to a platform or cabin structure substitutes the Master Controller for their individual controllers. This substitution can be arranged by a "plug in" connection which operates in a similar manner to a telecommunications change-over panel.

Figure 6:
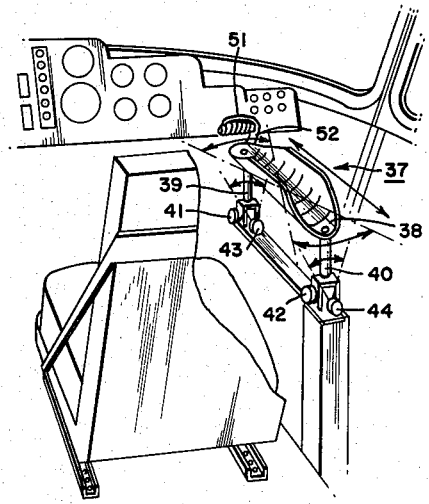
FIGURE 6 is a view of pilot's controls.
Figure 7:
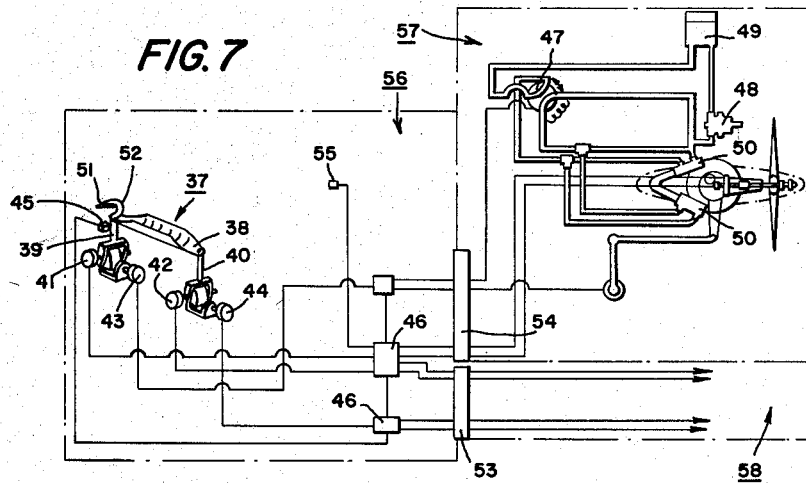
FIGURE 7 is a diagram of control arrangements.

A Master Controller suitable for use in constructions where each assembled slave unit has one propeller for propulsion and directional control, as exemplified in FIGURE 5, is illustrated in FIGURES 6 and 7. The Master Controller, generally indicated as 37, comprises a directional controller 38 formed as a pilot's arm rest. The pilot's forearm resting thereon represents the fore-and-aft axis of the composite vehicle or train.

The arrangement is such that movement of the directional controller 38 in a given direction as indicated by the arrows in FIGURE 6, from the "neutral" position shown, causes the composite vehicle to respond in the same sense. For master control purposes, the slave vehicles or units are divided into a forward group and a rear group. All the propellers within each respective group are synchronously operated. Levers 39 and 40 are interconnected by the directional controller 38. These levers each operate two banks of potentiometers, namely, a bank of propeller pitch control potentiometers 41, 42 and a bank of steering potentiometers 43, 44. One potentiometer of each bank associated with one of the levers 39 or 40 is provided for each slave unit system. The lever 39 operates potentiometer banks 41 and 43 for connection to the forward slave group. Similarly, lever 40 operates banks 42 and 44 for connection to the rear group. For simplicity, FIGURE 7 diagrammatically shows the system applied to a main cabin structure 56, one slave of the forward group 57, and circuits for connection to a slave of the rear group 58, coupling connections being represented by 53 and 54.

The associated pairs of potentiometers 41, 43 and 42, 44 are pre-calibrated relatively to the fore-and-aft axis of the composite vehicle or master vehicle of the assembly, the position of the peripheral coupling to which a slave is to be coupled, and the angle by which the fore-and-aft axis of the associated slave will be off-set relatively to the master axis when coupled. This pre-calibration provides, when slaves are coupled to the master controller 37, an electrical bias which synchronises alignment of all propeller thrust lines parallel to the master axis when the master controller 37 is in "neutral" as shown, e.g. by Selsyn motor action. Fore and aft movements of the controller 38 actuates potentiometers 41, 42. These transmit appropriate signals to individual propeller pitch control valves located in the propeller nacelles. Pitch change mechanisms are operated by hydraulic pressure derived from transmission lubrication systems. Lateral movements of the controller 38 operate potentiometers 43 and 44, and each of these transmits signals to an electro-hydraulic valve which governs the swivelling of the associated propeller to provide directional control. Potentiometers 43 are connected to the forward group of slaves, whilst potentiometers 44 control the rear group. Turning the controller 38 in the horizontal plane also operates potentiometers 43 and 44, but in opposite directions; therefore, when this is done the forward and rearward groups of propellers respectively swivel in opposite directions. The combined action of turning the controller 38 and moving it to one side causes only one of the potentiometers 43, 44 to be operated; the one that is operated is determined by the direction in which the controller 38 is turned and the side to which it is moved. If for example, the controller 38 is both moved and turned to starboard, potentiometer 43 is operated, but the combined movements in the case of potentiometer 44 cancel each other; hence, the forward propeller group swivels, whilst those of the rear group remain aligned with the master axis.

To maintain the directional relationship between control movement and craft response, the direction of propeller swivelling when in reverse pitch must be opposite to that for forward pitch. This change in swivelling direction is effected at zero pitch by an electrical change-over switch 45 (FIG. 7). The switch 45 is operated by the fore-and-aft movements of the controller 38 and controls a circuit to operating coils of reversing relays 46 incorporated in the swivelling control circuits to the slave vehicles 10. The hydraulic system for swivelling each propeller nacelle is entirely self-contained. It comprises an electro-hydraulic valve 47, an engine driven self off-loading hydraulic pump 48, an oil reservoir 49 and two hydraulic jacks 50. The jacks 50 are arranged so that in operation one retracts as the other extends and they are connected by their rams to a pivot pin on the propeller nacelle.

Forward movement of the controller 38 from the neutral position increases forward thrust, while rearward movement selects, and then increases, reverse thrust via the switch 45. A propeller-pitch trim switch 51 is incorporated in a pilot's hand grip 52, and provides the means of obtaining and adjusting a pitch differential between the forward and rear propeller groups. A "zero-pitch" selector switch 55 (FIG. 7) is also provided.

I claim as my invention:

1. A composite ground-effect vehicle, comprising: means forming a platform; a plurality of individually operable ground-effect machines; and means detachably connecting said ground-effect machines to the periphery of said platform substantially in sealing engagement therewith, whereby a supporting gas cushion is created under each of said individual ground-effect machines, and a corresponding gas cushion is created under said platform to at least in part support said platform.

2. A composite ground-effect vehicle as set forth in claim 1, further comprising means for effecting control of all of said individual ground-effect machines from at least one point on said composite vehicle.

3. A composite ground-effect vehicle, comprising: means forming a pay-load supporting platform; and means for creating a fluid cushion under said platform by directing a flow of fluid downwardly around the periphery of said platform, said last-mentioned means comprising a plurality of individually operable ground-effect machines detachably coupled to the periphery of said platform substantially in sealing engagement therewith, each of said machines comprising means for directing a flow of fluid downwardly around the periphery of the individual machine for maintaining a supporting fluid cushion under the individual machine, whereby said plurality of machines effect a substantially continuous downwardly directed flow around the periphery of said platform to maintain at least a partially supporting gas cushion thereunder.

4. A composite ground-effect vehicle as set forth in claim 3 wherein each of said individual machines is substantially of identical external size and shape so as to be freely interchangeable, and further comprising means for propelling said individual machines, means for steering said individual machines, and means for effecting control of all of said individual ground-effect machines from at least one point on said composite vehicle.

5. A composite ground-effect vehicle as set forth in claim 4 wherein said individual machines and said platform carry on their respective peripheries mutually engageable connecting means, at least one of said two peripheries having sealing means thereon, said platform also having reinforcing superstructure thereon and additional detachable connecting means extending between said superstructure and a point on each of said individual machines for stabilizing said machines relative to said platform.

6. A composite ground-effect vehicle, comprising: a member having a substantially horizontally disposed bottom area; means for maintaining a supporting fluid cushion under said bottom area by directing a flow of fluid downwardly and substantially continuously around the periphery of said member, said last mentioned means comprising a plurality of individually operable ground-effect machines detachably and sealingly coupled to the periphery of said member, each of said machines comprising means for directing fluid downwardly from the individual machine for supporting the individual machine.

7. A composite ground-effect vehicle as set forth in claim 1 wherein said means forming a platform comprises an individually operable ground-effect machine.

References Cited by the Examiner
UNITED STATES PATENTS
3,052,483  9/62  Petersen _____ 180—7

FOREIGN PATENTS
1,238,499  7/60  France.

A. HARRY LEVY, Primary Examiner.
PHILIP ARNOLD, Examiner.